US008382086B2

(12) United States Patent
Bresette

(10) Patent No.: US 8,382,086 B2
(45) Date of Patent: Feb. 26, 2013

(54) UNIVERSAL MOUNTING PLATFORM AND SYSTEM

(76) Inventor: Ellie Bresette, Bayfield, WI (US)

(*) Notice: Subject to any disclaimer, the term of this patent is extended or adjusted under 35 U.S.C. 154(b) by 0 days.

(21) Appl. No.: 13/358,802

(22) Filed: Jan. 26, 2012

(65) Prior Publication Data

US 2012/0312197 A1 Dec. 13, 2012

Related U.S. Application Data

(60) Provisional application No. 61/494,630, filed on Jun. 8, 2011.

(51) Int. Cl.
*B23Q 3/00* (2006.01)

(52) U.S. Cl. .................................................. 269/289 R

(58) Field of Classification Search ............. 269/289 R, 269/16, 271, 309; 144/286.1, 286.5, 287; 83/469; 108/53.3, 57.15, 56.3, 25, 43, 49, 108/55.5, 57.25, 27; 312/334.27
See application file for complete search history.

(56) References Cited

U.S. PATENT DOCUMENTS

| | | | | |
|---|---|---|---|---|
| 1,442,865 | A * | 1/1923 | Dyer | 69/16 |
| 2,256,943 | A * | 9/1941 | Dunbeck | 106/38.27 |
| 2,682,899 | A * | 7/1954 | Miller | 144/286.1 |
| D207,972 | S | 6/1967 | Bellaire | |
| 3,797,906 | A * | 3/1974 | Gutner | 312/334.27 |
| 5,193,598 | A * | 3/1993 | Estrem | 144/287 |
| 5,592,981 | A * | 1/1997 | Derecktor | 144/286.1 |
| 5,685,441 | A * | 11/1997 | Calfee | 211/194 |
| 5,836,365 | A * | 11/1998 | Derecktor | 144/287 |
| 5,875,828 | A * | 3/1999 | Quiram et al. | 144/329 |
| 5,884,681 | A | 3/1999 | Nickles | |
| 5,921,301 | A * | 7/1999 | Quiram et al. | 144/329 |
| 5,988,243 | A * | 11/1999 | Ayala et al. | 144/329 |
| 6,131,626 | A | 10/2000 | Raill | |
| 6,199,608 | B1 * | 3/2001 | Ayala et al. | 144/286.1 |
| 6,415,831 | B2 * | 7/2002 | Ayala et al. | 144/286.1 |
| 6,460,471 | B1 * | 10/2002 | Yang | 108/156 |
| 6,595,251 | B2 * | 7/2003 | Ayala et al. | 144/286.1 |
| 6,637,738 | B1 * | 10/2003 | Beaudet | 269/271 |
| 7,048,021 | B2 * | 5/2006 | Ayala et al. | 144/287 |
| 7,252,125 | B2 * | 8/2007 | Haag | 144/286.5 |
| 7,530,377 | B2 * | 5/2009 | Ayala et al. | 144/286.5 |
| 7,677,283 | B2 | 3/2010 | Hooker | |
| D623,672 | S | 9/2010 | Francis et al. | |
| 7,814,947 | B2 * | 10/2010 | Ayala et al. | 144/286.1 |
| 8,167,011 | B2 * | 5/2012 | Quiram et al. | 144/286.1 |
| 2001/0022205 | A1 * | 9/2001 | Ayala et al. | 144/286.1 |
| 2002/0129870 | A1 * | 9/2002 | Ayala et al. | 144/286.5 |
| 2003/0192623 | A1 * | 10/2003 | Ayala et al. | 144/287 |
| 2004/0200545 | A1 * | 10/2004 | Ayala et al. | 144/286.5 |
| 2006/0180244 | A1 * | 8/2006 | Ayala et al. | 144/287 |
| 2006/0213578 | A1 * | 9/2006 | Haag | 144/287 |
| 2007/0121206 | A1 * | 5/2007 | Liang et al. | 359/443 |
| 2007/0235107 | A1 * | 10/2007 | Winskunas | 144/286.1 |
| 2009/0183801 | A1 * | 7/2009 | Ayala et al. | 144/286.5 |
| 2011/0000581 | A1 * | 1/2011 | Ayala et al. | 144/286.5 |
| 2011/0227271 | A1 * | 9/2011 | Edelmann | 269/289 R |

* cited by examiner

*Primary Examiner* — Lee D Wilson
*Assistant Examiner* — Jamal Daniel
(74) *Attorney, Agent, or Firm* — Anthony J. Bourget

(57) ABSTRACT

A platform and system for mounting a tool or appliance to a workstation or for use on other surfaces. The platform is portable and includes a clamping bar and receiving pockets for receiving tables of an adjustable workstation and mounting pockets for accommodating placement of fastening hardware to secure the tool to the platform. The receiving pockets allow the tables to adjust and clamp upon the clamping bar. The mounting pockets allow the hardware to maintain independence from the workstation to which the platform is mounted.

31 Claims, 6 Drawing Sheets

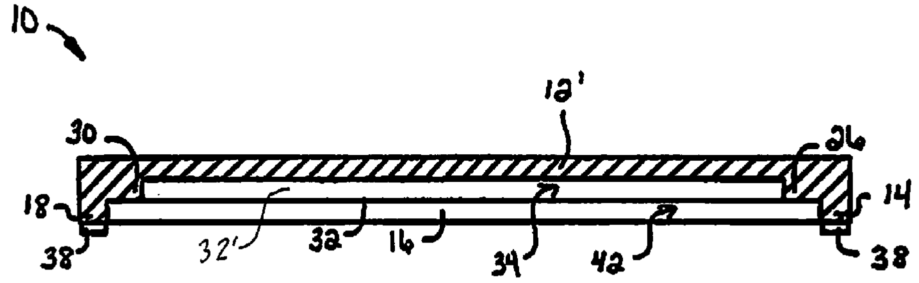
Fig. 7
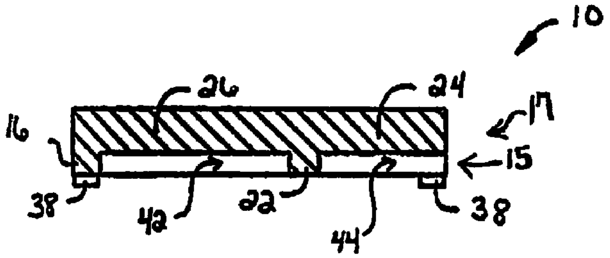
Fig. 8
Fig. 9
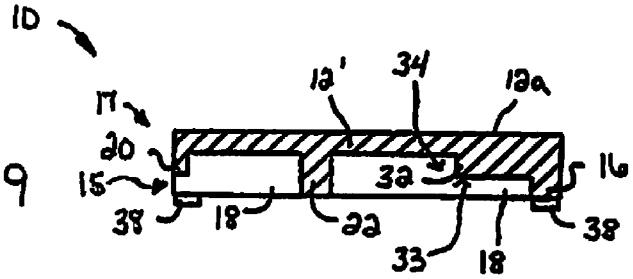

UNIVERSAL MOUNTING PLATFORM AND SYSTEM

RELATED APPLICATIONS

This application claims the benefit and priority of Provisional Patent Application Ser. No. 61/494,630 filed Jun. 8, 2011, for a UNIVERSAL MOBILE MOUNTING SYSTEM FOR BENCH TOP STYLE TOOLS AND OTHER MOUNTABLE TOOLS under 35 U.S.C. §119(e), incorporated herein by reference.

BACKGROUND OF THE INVENTION

1. Field of the Invention

The present inventive concept relates generally to platforms to which tools and other items may be mounted and related systems for using the same, and more specifically to portable platforms and systems for bench top style tools.

2. Background Information

Tradesmen, contractors, shop operators and others use a variety of tools for construction, remodeling or work. Often the tools are powered devices such as drill presses, grinders, routers, sanders, saws, circular saws, band saws, planers, scroll saws, lathes, or other tools and the like. It is desired to have such tools on-site for efficiency of working, yet often the tools can be heavy or difficult to transport, place, stabilize or store.

Tradesmen, contractors, shop operators and others also use a variety of work benches or work stations when working in their trade or as a hobby. Often a worker will use a sawhorse or a number of sawhorses to set as a table to hold work tools or other equipment or materials. Sometimes a worker will construct a makeshift table, or even use the folded-down gate or bed of a pickup truck as a work surface. A workbench, depending on size, can receive a variety of tools. Tools are typically mounted to a workbench in order to operate the tool safely. Properly securing a tool to a workbench can be time consuming and also takes up valuable work-space. Once a tool is mounted to a workbench, it generally is not moved, or if it is moved, time and effort are required.

In some instances a worker will use a workstation as a platform to hold materials. There are some common or standard types of commercially available workstations available. A few examples include the Workmate™ by Black & Decker, such as model 125 and model 225. Such workstations typically include split tables supported on a base. The workstation table is split into two table elements that separate from each other and close together by rotation of hand-cranks. The table elements thus work as a vice or to clamp materials between the table elements so that a worker can insert materials to be held in place for assembly or manipulation. Such workstations have proven very popular. While the foregoing workstations and use of a variety of tools on-site is beneficial, there is always room for improvement.

SUMMARY OF THE INVENTION

The present inventor has recognized that mounting of tools or appliances to workbenches or workstations can be cumbersome, time consuming and inefficient. Mounting tools or appliances on a workbench takes up time and space that can otherwise be used for working purposes. Mounting typically requires holes to be drilled into the workbench or table, etc. Also, the present inventor has recognized that it is unworkable or unacceptable to directly mount certain tools, such as power tools noted above, to a standard commercially available workstation such as a Workmate™. Doing so minimizes at least some of the benefits of such workstations, such as use of the clamping features. Also, to do so heretofore required the use of bolts or screws to mount the tool to the workstation (i.e., it would not be typical, or could be dangerous or difficult, to secure a grinder tool or a circular saw, for instance, to a commercial workstation such as a Black & Decker Workmate™. Further, if a tool is mounted with bolts or screws, additional work is needed to remove the tool or to replace the tool with a different tool. Doing so would also result in holes placed within the table members of the workstation. Even if a tool is somehow mounted, doing so is not easy and would require some effort and uncertainty of whether the tools is mounted securely.

The present inventor, however, has recognized that with use of a specially designed platform, tools such as those mentioned above may be securely mounted to the platform. Moreover, the combined tool and platform may be placed on a workbench, table, truck bed, etc., for efficient use. The platform allows for the tool to be later efficiently removed from the workbench, etc. Moreover, the platform with tool may be efficiently secured to a workstation. Different types of tools can be mounted to the platform so a variety of uses can be achieved. Further, multiple platforms can be used to accommodate mounting of different tools that can be easily exchanged for a desired use. The tools and platforms that are not in use can be efficiently stored in a location away from the workstation or the workbench, and conveniently underneath a workbench or on shelving. Appliances such as meat grinders (powered or non-powered) or other work equipment also operate as tools and will be considered as tools herein.

Heretofore unrelated to the use of a standard commercially available clamping workstation is the use of a platform-mounted tool and system. In accordance with one aspect of the invention, the problem appreciated by the inventor of securing a tool (or tools such as those noted above, or even appliances including but not limited powered or non-powered meat grinders or other appliances) to a standard commercially available clamping workstation is solved by utilizing a properly constructed platform and mounting the tool to the platform. The platform is configured so that the tool may be securely mounted to the platform which in turn is securely clamped to the workstation. In one aspect the platform includes a mounting pocket for receiving hardware to mount the tool to the platform, and a receiving pocket to receive a table member of the workstation. The table member of the workstation fits into the receiving pocket and the clamping action of the workstation secures the platform onto the workstation. In a further aspect the platform is configured to receive a fastener while a clamping bar of the platform is clamped between clamping table members of the workstation where the fastener is maintained in a spaced relationship with respect to the clamping table members. In such aspect the platform includes a table support that maintains contact with at least one of the clamping table members.

An object of the invention is to provide a platform that allows for efficient mounting of a tool or appliance to a workstation.

An object of the invention is to provide a platform that also allows for stable placement of a tool on a workbench or other surface.

An object of the invention is to provide a platform and system that allows for a tool to be mounted to a workstation having a clamping table member and such that fasteners used to secure a tool to the platform are in a spaced relationship with respect to the table members.

An object of the invention is to provide platform and system that accommodates mounting of a variety of types of tools or appliances to a variety of types of workstations.

The above summary of the present invention is not intended to describe each illustrated embodiment, aspect, or every object or implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 7 is a section view of the feature of FIG. 2 along line 7-7 in FIG. 3;

FIG. 8 is a section view of the feature of FIG. 2 along line 8-8 in FIG. 3;

FIG. 9 is a section view of the feature of FIG. 2 along line 9-9 in FIG. 3.

Figure 1:
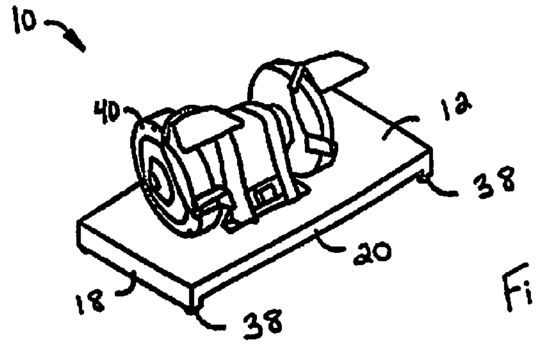
FIG. 1 is a perspective view of a mounting system in use according to one aspect of the invention.

While the invention is amenable to various modifications and alternative forms, specifics thereof have been shown by way of example in the drawings and will be described in detail. It should be understood, however, that the intention is not necessarily to limit the invention of the particular embodiments described.

DETAILED DESCRIPTION OF THE INVENTION

The following detailed description is not to be taken in a limiting sense, but is made merely for the purpose of illustrating the general principles of the invention, since the scope of the invention is best defined by the appended claims.

Broadly, an embodiment of the present invention generally provides a universally applicable work/tool-mounting device having multiple components within a single unit including a working surface, support beams, clamping bar, table supports and feet. It further includes pockets for tool or appliance mounting.

Figure 2:
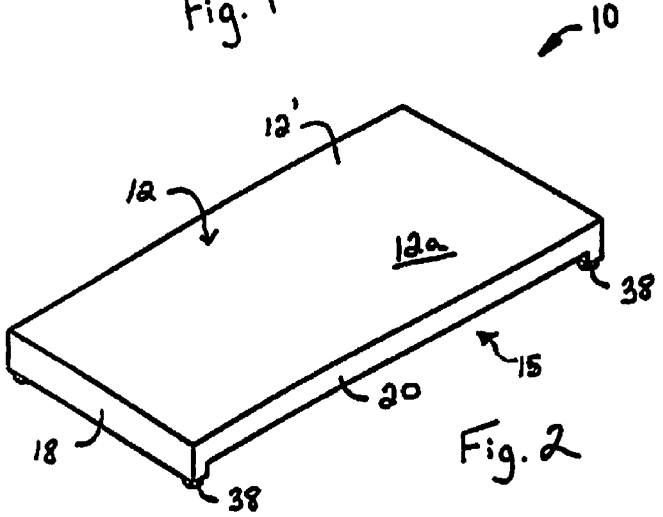
FIG. 2 is a perspective view of a platform feature of the system of FIG. 1.
Figure 3:
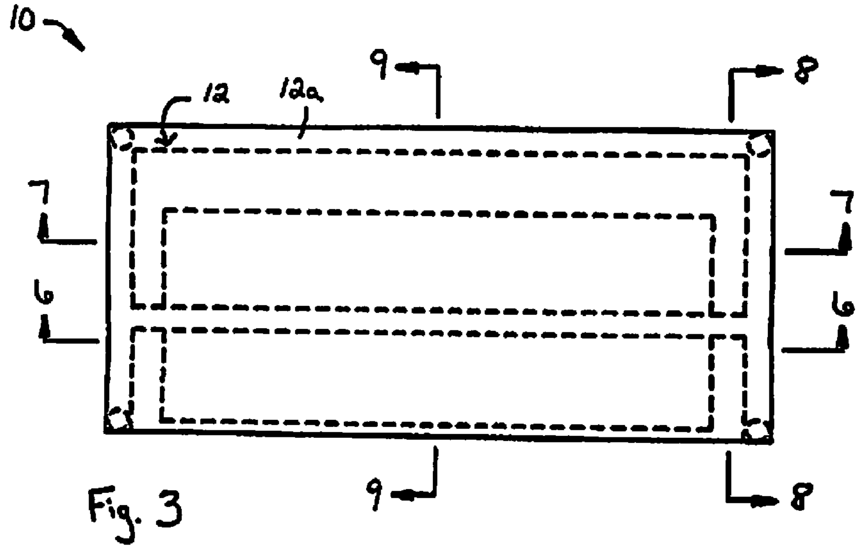
FIG. 3 is a top view of the feature of FIG. 2.
Figure 12:
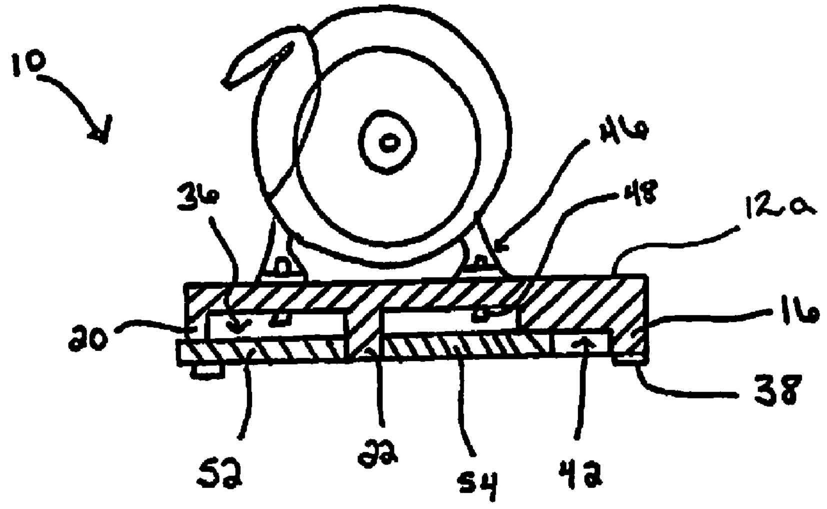
FIG. 12 is a partial section view of the mounting system along a reverse angle view along line 11A-11A of FIG. 10 with a portion of workstation removed for clarity.
Figure 13:
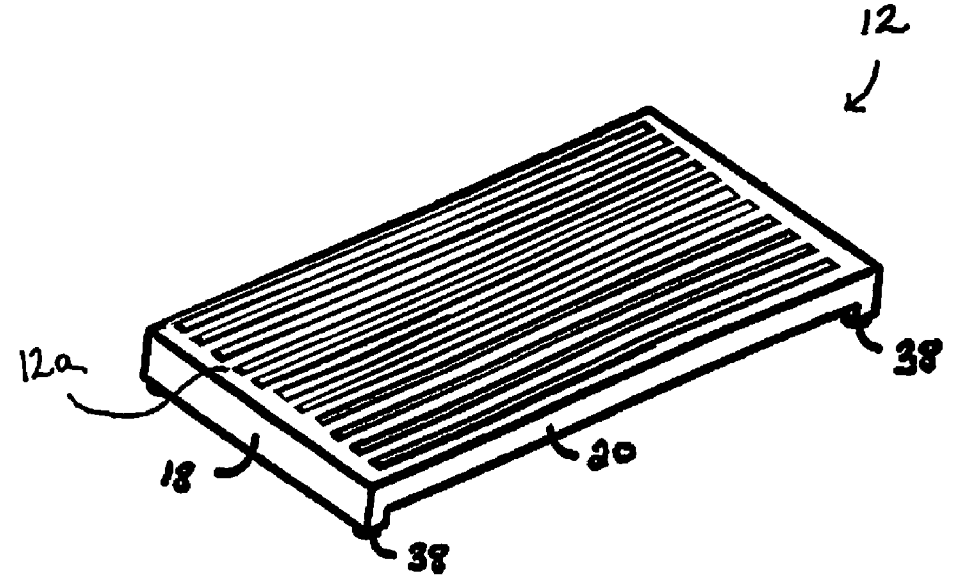
FIG. 13 is a perspective view of a platform feature according to a further aspect of the invention.

According to exemplary aspects of the invention (FIGS. 1 to 13), the device 10 includes an optionally rectangular, substantially flat work/mounting platform 12 (FIG. 2). Platform 12 may be made of wood, metal, plastic or other suitable material. Platform 12 may also include holes or "waffle" or other design structure, including a web-design structure made of plastic. FIG. 13 shows one alternative aspect of platform 12 having slots or gaps. Alternative webs or design structures may be used. Fasteners may pass through holes or slots that may also be defined by platform 12. Preferably platform 12 defines a generally planar surface. The work/mounting platform 12 can be used with most standard commercially available workstations, for example with Workmate™ by Black & Decker, models WM125, WM225 and WM425 or other models. The dimensions of the work/mounting platform 12 can be modified to accommodate other workstations or various tool base sizes. In one aspect the working mounting platform 12 (FIGS. 2 and 5) can have a width (x axis) of 67.3 cm (26.5"), which could be from 45.7 cm to 81.3 cm; a length or depth (z axis) of 33 cm (13"), which could be from 25.4 cm to 61.8 cm; and a thickness or height (y axis) of 5.7 cm (2.25") without feet 38, which could be from 2.5 cm to 7.6 cm. The foregoing dimensions may vary depending on the size of a workstation to which device 10 will be connected as described below. The internal or underside components (FIG. 4) can be increased or decreased according to the dimension of the particular or desired workstations. For instance, the dimensions of platform 12 are preferably configured to allow for use on the WorkMate variety of workstation. The rear tables of such workstations, for instance, vary depending on the model. Model WM 125 has an adjustable rear table that is 24 inches long and 4 ½ inches wide. The Model WM 225 has and adjustable rear table that is 24 inches long and 4 ⅞ inches wide. The Model WM 425 has a movable front table and a set rear table. The set rear table measures 29 ⅛ inches long by 8 ⅜ inches wide. Platform 12 is preferably configured to receive the clamping tables of the Workmate products, and the dimensions of those products are hereby incorporated herein by reference. It may be appreciated that the platform 12 may also be used on workstations that are different than the WorkMate models. It may also be appreciated that the platform 12 may also be used independently of any workstation.

Figure 4:
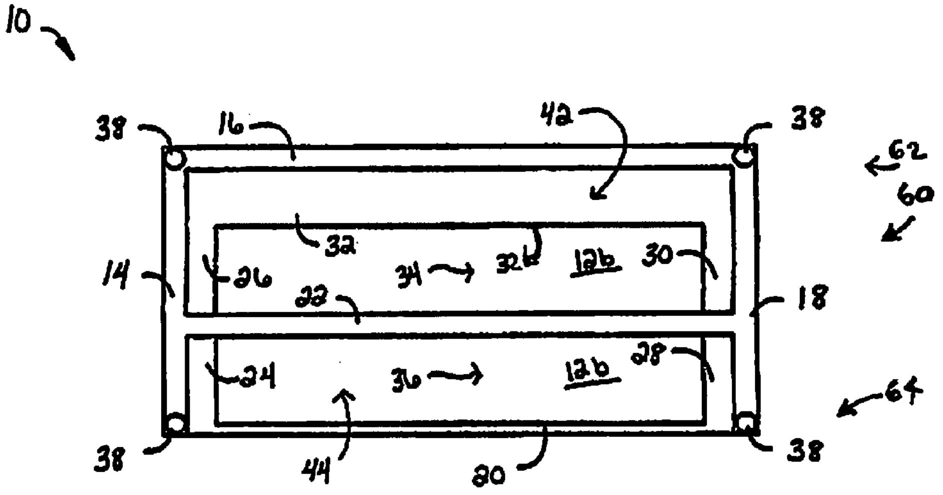
FIG. 4 is a bottom view of the feature of FIG. 2.
Figure 5:
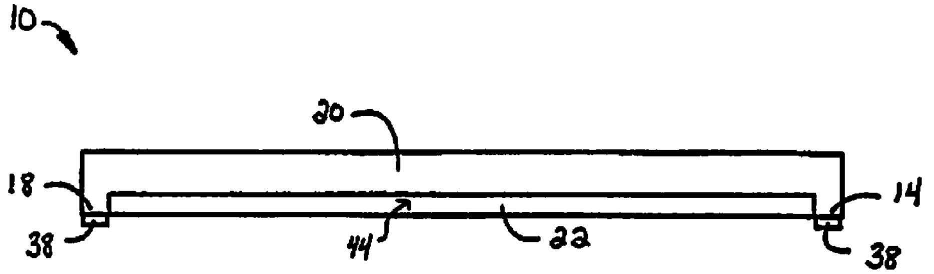
FIG. 5 is a front view of the feature of FIG. 2.
Figure 6:
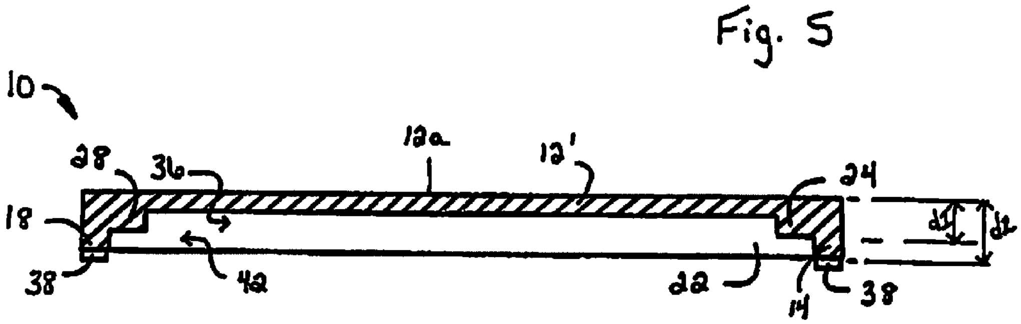
FIG. 6 is a section view of the feature of FIG. 2 along line 6-6 in FIG. 3.

The device 10 may include support beams (FIG. 4), including a right support beam 14, a left support beam 18 and a rear support beam 16 for the work/mounting surface 12. The support beams 14, 16, and 18 generally extend from base 12' in a direction opposite mounting surface 12*a*. Table supports may be integrally connected to base 12'. Feet 38 which may be made of rubber or other material may be attached at each end or corner of device 10, preferably to the bottom of support beams 14 and 16 (FIGS. 1,2, and 4 to 9). Device 10 may also include a front table support 20 that can be installed at the front of the work/mounting surface between the right and left support beams 14, 18 (FIG. 2) and a rear table support 32 (FIGS. 4,7, and 9).

The interior underside of the work/mounting surface 12, or base underside surface 12*b*, may be surrounded in part by right support beam 14, rear support beam 16 and left support beam 18, and front table support 20 (FIG. 4) and rear table support 32 (FIGS. 4, 7 and 9.) It may be appreciated that a "double step" feature is presented by use of support beams (such as beams 14, 16, and 18) and table supports (such as supports 24, 26, 28, 30 and 32). See for instance FIG. 6, FIG. 7 and FIG. 9. This "double step" feature accommodates use of pockets as described below. Preferably table supports 24, 26, 28, 30, 32 (or at least one of them) extend a first distance "d1" (see FIG. 6) from base mounting surface 12*a* and clamping bar 22 extends a second distance "d2" from mounting surface 12*a* where the first distance d1 is less than the second distance d2. It may be appreciated that table supports include a contact surface, such as contact surface 33 which faces generally opposite mounting surface 12*a* (See, for instance, FIG. 9). All table supports preferably include such contact surface.

Rear table support 32 may have at least two functions: one to rest on the surface of a workstation such as a Workmate, and the other for tool mounting by means of lag type fasteners (in situations where the base of the tool 40 being mounted to the platform 12 has a dimension requiring fastening into support 32 as opposed to or in addition to placing fastening hardware in mounting pockets 34, 36 as described below. In other words, a mounting screw or lag bolt may be inserted into rear table support 32 (or into the other table supports 24, 26, 28, 30; and also into clamping bar 22). Rear support beam 16 (and/or support beams 14, 18) can provide overall stability of the device when used on a workbench, tailgate, sawhorse, etc. It may be appreciated that optionally rear support beam 16 may be eliminated or reduced so that rear receiving pocket 42 has no rear border (or a limited rear border) and may receive a table of greater dimension. If rear support beam 16 is not present or is reduced, preferably end support beams such as right support beam 14 and/or left support beam 18 are in place to support platform 12 on a surface. Such support beams will prevent or reduce the tendency of platform 12 to otherwise rock or tip upon clamping bar 22. The device 10 shown in FIG. 1 may be placed upon a table, sawhorses, workstation or other support in order to conveniently position tool 40. Device 10 may be moved and stored as desired. The tool 40 therefore need not be attached directly to a work bench, table or other surface. A user may have a variety of tools 40, such as those described above, where each tool is mounted to its own platform 12.

Figure 14:
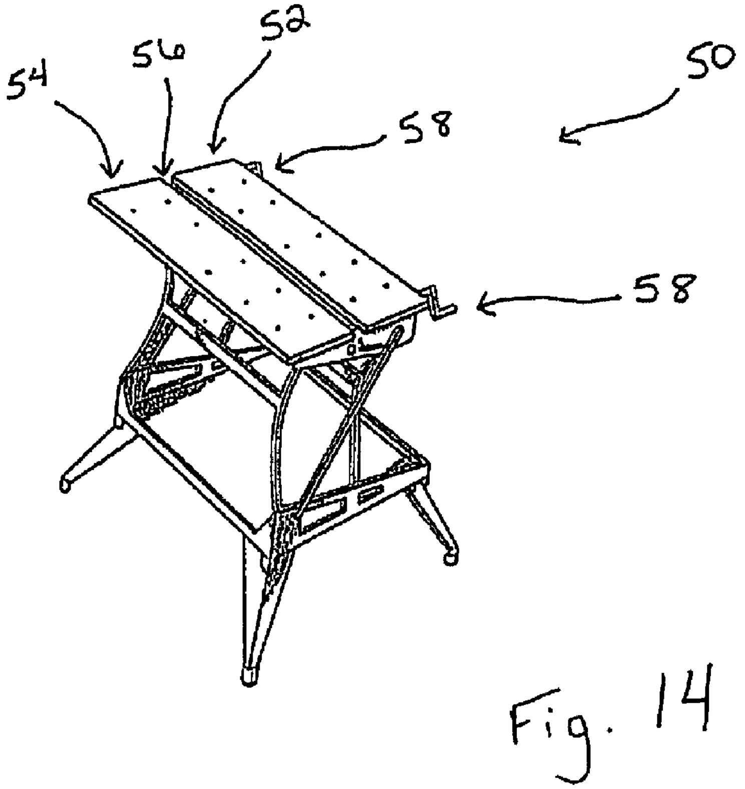
Fig. 14 (Prior Art)
FIG. 14 is a perspective view of a prior art exemplary workstation.

Preferably device 10 is mountable to a workstation. A representative workstation 50 is shown in FIG. 14. Different types of workstations 50 are contemplated under the invention. Typically a workstation 50 includes a front table 52 (i.e. a clamping table) and a rear table 54 (i.e., clamping table). Handles 58 are used to turn a threaded means so that table 52 moves toward and engages table 54. Such movement operates like a vice to clamp an object or objects located in a gap 56 between table 52 and table 54. Alternatively, a workstation may have a fixed front table 52 and a movable rear table 54 as is also common.

Figure 10:
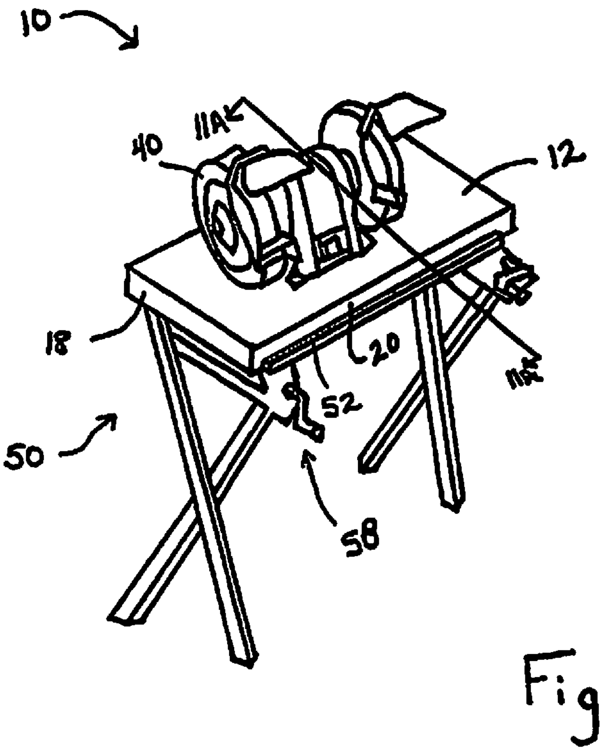
FIG. 10 is a perspective view of a mounting system in use according to a further aspect of the invention.
Figure 11A:
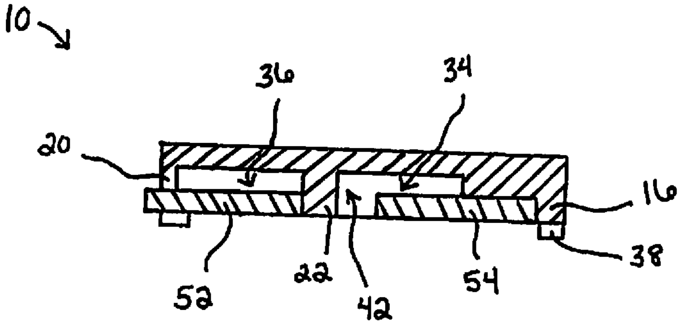
FIG. 11A is a partial section view of a platform feature of the system of FIG. 10 along line 11A-11A in FIG. 10 with tool or appliance feature removed for clarity.
Figure 11B:
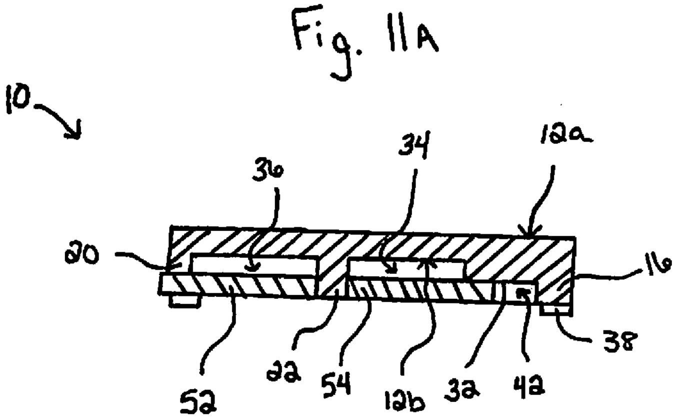
FIG. 11B is a partial section view of a platform feature of the system of FIB. 10 along line 11A-11A in FIG. 10 with a tool or appliance feature removed for clarity.

Work/mounting platform 12 includes a clamping bar 22 preferably running the length of the underside between the right support beam 14 and left support beam 18 (see FIG. 4). The clamping bar 22 can be located within a set distance from the front table support 20 to accommodate the size and depth of the fixed front table 52 of a workstation such as a Workmate™ or other work station. As shown in FIG. 10, front table 52 may extend beyond front table support 20. It may be appreciated that at least a table support such as table support 20 and a support beam such as support beam 18 may define a pocket opening 15. As shown with reference to FIGS. 2, 8 and 9, pocket opening 15 is provided at a perimeter or at an edge 17 of platform 12. Access to receiving pocket 44 may be made through pocket opening 15. As shown in FIGS. 10, 11A and 11B, table 52 extends through pocket opening 15. In other applications, front table 52 may align flush with support 20. If platform 12 extends beyond front table 52, there is a risk that handles 58 may be inhibited from rotation as desired.

In operation, device 10 may be positioned on workstation 50 generally as shown in FIG. 10. With reference to FIG. 4, and when device 10 is oriented as shown in FIG. 2 and positioned on station 50, preferably front table support 20, forward right table support 24, rear right table support 26, forward left table support 28, rear left table support 30, and rear table support 32 (or some of them) may rest on the fixed front table 52, and on adjustable rear table 54 of the Workmate™ or workstation. In such orientation, clamping bar 22 is positioned in gap 56 (See FIG. 140 between front table 52 and rear table 54. Clamping bar 22 may extend below front table 52 and rear table 54. As the Workmate™ or workstation's rear adjustable table 54 is brought forward by turning handles 58, the work/mounting device 10 is clamped onto workstation 50. FIG. 11A depicts device 10 positioned with respect to workstation 50 where rear table 54 is positioned within rear receiving pocket 42, and front table 52 is positioned within front receiving pocket 44 (See also FIG. 4 and FIG. 5). As handles 58 are rotated, rear table 54 draws closer to front table 52. As shown in FIG. 11B, rear table 54 has drawn toward front table 52 and in contact with clamping bar 22. It may be appreciated that rear table support 32 preferably maintains contact with rear table 54 (see, for instance, at contact surface 33, FIG. 9). Preferably at least a ½ inch contact region is maintained once clamping is achieved in order to maintain stability of support. A user may turn handles 58 to tighten tables 52, 54 upon clamping bar 22 as may be appreciated. It may be appreciated that rear receiving pocket 42 has a dimension large enough to receive rear table 54 such that table 54 may slide therein. Additionally, the rear table 54 of workstation 50 is preferably always in contact with the rear left table support 30 and rear right table support 26 to maintain stability when nested.

In a further aspect, clamping bar 22 (FIG. 4) divides the underside of the table into at least two mounting pockets, 34, 36. Rear mounting pocket 34 is located between rear right table support 26, rear left table support 30, rear table support 32, and clamping bar 22. Front mounting pocket 36 is located between forward right table support 24, forward left table support 28 and front table support 20. When placed upon station 50, front table 52 and rear table 54 further define respective front mounting pocket 36 and rear mounting pocket 34. Advantageously, mounting pockets 34, 36 provide a space for receiving fasteners and hardware components for mounting tool 40 to platform 12. Particularly, as shown in FIG. 12, fasteners 46 may extend through base 12' and into pockets 34, 36. Within pockets 34, 36, additional hardware such as nuts and washers 48 or other hardware may be position for mounting tool 40. Pockets 34, 36 accommodate efficient mounting of tool 40 upon platform 12 and in turn upon station 50. Pockets 34, 36 allow hardware or fasteners 46 to be positioned in a spaced relationship with respect to table 52, 54. As such tables 52, 54 are not damaged by such hardware, thus prolonging the life of station 50. Further, such orientation avoids contact to fasteners 46 which might otherwise loosen the mounting of tool 40 from platform 12. Instead, a secure mounting of platform 12 to station 50 can be maintained by the clamping action upon clamping bar 22 and support of table supports such as rear table support 32 and other table supports. Use of pockets 34, 36 allows for tool 40 to be securely mounted to platform 12 which may in turn be securely clamped to workstation 50. The pockets 34, 36 allow for fasteners to be used without contacting workstation 50. If fasteners contact workstation 50, a firm or secure clamping action of platform 12 to workstation 50 may otherwise be difficult to achieve. It may be appreciated that device 10 may also be used with a workstation 50 where the rear table 54 remains stationary and the front table 52 adjusts, and vice versa.

Platform 12 preferably is configured to fit snugly upon tables 52 such that left support beam 18 and right support beam 14 extend over the edges of tables 52, 54 while minimizing clearance between tables 52, 54 and beams 14, 18.

The device can be used either as a base on which tools may be mounted, or it may be used in combination with a work station stand. In the first application, a bench top tool or appliance 40 may be mounted to the device 10 using the tool or appliance manufacturer's recommendation, for example, by drilling into or through the top of the work/mounting surface 12 and using fasteners 46 to anchor the tool 40 using the mounting pockets 34, 36 or table supports 24, 26, 28, 30 and 32. Device 10 can be used on a workbench, tailgate, sawhorse, floor or on flat surfaces. The mountable tool 40 can be supported and kept from moving because of being secured to the device and its attached rubber feet 38. The described device 10 and attached mountable tool 40 may also be used with a Workmate™ or other work station to transform the Workmate™ into a temporary mobile tool stand and system.

A further aspect of the invention is the method of securing a tool or appliance 40 to platform 12, and also of securing device 10 to workstation 50. The foregoing methods utilize the foregoing features of platform 12 in order to secure hardware within pockets 34, 36.

A person of ordinary carpentry skills can make the described device based on the components described, and can assemble it using ordinary fasteners, optionally together with glue or other adhesive.

It should be understood, of course, that the foregoing relates to exemplary embodiments of the invention and that modifications may be made without departing from the spirit and scope of the invention as set forth in the following claims.

What is claimed is:

1. A portable mounting platform for supporting a tool or appliance affixed thereto, said platform comprising:

a base having a mounting surface;

a table support positioned at a perimeter of said base and extending a first distance from said base opposite said mounting surface;

a clamping bar connected to said base along a generally medial region of said base and extending a second distance, greater than the first distance, from said base opposite said mounting surface and configured to be received within a gap of a clamping workstation; and a first support beam connected to and extending from said base opposite said mounting surface, and a second support beam, said clamping bar, said first support beam and said second support beam define a first receiving pocket configured to receive a table of a clamping workstation.

2. The platform of claim 1 where said first support beam extends a third distance from said mounting surface, the second distance being the same as the third distance.

3. The platform of claim 1 where said first support beam is a rear support beam aligned along an edge of said base and oriented parallel to said clamping bar.

4. The platform of claim 3 where said clamping bar spans a length of the gap of the clamping workstation.

5. The platform of claim 1 further comprising a further table support extending from said base and oriented generally perpendicular to said clamping bar.

6. A device comprising a tool or appliance affixed to said mounting platform of claim 1.

7. The device of claim 6 where said mounting surface is oriented generally along a horizontal plane when said platform is clamped upon a clamping workstation positioned upon a horizontal surface and when said platform is placed upon a horizontal surface.

8. A method of securing a tool or appliance to a workstation having clamping tables defining a gap, said method comprising:

fastening the tool or appliance to a platform; and adjusting the clamping tables of the workstation to clamp the platform to the workstation, the platform comprising:

a base having a mounting surface;

a clamping bar connected to and extending from the base, the clamping bar configured to insert within the gap such that closing the clamping tables of the workstation clamps the clamping bar positioned within the gap; and a first table support extending from the base, the base, clamping bar and the first table support at least in part defining a mounting pocket.

9. The method of claim 8 further comprising at least two support beams and where said table support includes a contact surface opposite said mounting surface, said receiving pocket defined at least in part by said clamping bar, said at least two support beams and said contact surface.

10. The method of claim 8 where said mounting pocket is further defined in part by a second table support and third table support.

11. The method of claim 8 where said platform includes at least one receiving pocket for receiving a clamping table of the workstation, said receiving pocket defined in part by said clamping bar and at least one table support extending from said base.

12. A mounting platform for use in conjunction with a workstation having clamping tables, said platform comprising:

a base having a substantially planar mounting surface;

at least one table support extending from said base opposite said mounting surface and configured to contact at least one of the clamping tables, said table support having a contact surface opposite said mounting surface; and a clamping bar connected to and extending from said base opposite said mounting surface;

said platform configured to receive a fastener through said base while said clamping bar is clamped between clamping tables of the clamping work station and where the fastener is positioned over at least one of the clamping tables and maintained in a spaced relationship with respect to at least one of the clamping tables and where said contact surface of said table support is in contact with at least one of the clamping tables.

13. The platform of claim 12 where said at least one table support extends a first distance from said base and said clamping bar extends a second distance from said base, the second distance being greater than the first distance.

14. The platform of claim 12 where said base is made of plastic and defines openings within said substantially planar surface.

15. A portable mounting platform for clamping to a workstation having clamping tables, said platform comprising:

a base having a substantially planar mounting surface and an underside surface opposite said mounting surface;

a first support beam and a second support beam extending opposite said mounting surface;

a table support positioned on said base and extending opposite said mounting surface; and a clamping bar positioned on said base and extending opposite said mounting surface, said clamping bar oriented generally perpendicular to said first support beam and said second support beam;

said clamping bar and said first support beam in part defining a receiving pocket configured to receive a table of a work station;

said table support and said first support beam in part defining a receiving pocket opening for access to said receiving pocket from an edge of said platform.

16. The platform of claim 15 where said table support and said underside surface in part define a first mounting pocket.

17. The platform of claim 16 where said first mounting pocket is further defined by a right table support and a left table support positioned generally opposite said right table support.

18. The platform of claim 15 further comprising a forward right table support and a forward left table support positioned generally opposite said forward right table support, said clamping bar, said forward right table support and said forward left table support in part defining a second mounting pocket.

19. The platform of claim 18 where said front table support in part defines said second mounting pocket.

20. The platform of claim 15 where said first support beam is positioned generally opposite said second support beam, said receiving pocket is defined in part by said first support beam and said second support beam.

21. The platform of claim 15 where said first support beam is positioned generally opposite said second support beam, said clamping bar, said first support beam and said second support beam defining a further receiving pocket.

22. The platform of claim 15 where said at least one table support extends a first distance from said base and said clamping bar extends a second distance from said base, the second distance being greater than the first distance.

23. The platform of claim 15 where said at least one table support extends a first distance from said base and said first support beam extends a second distance from said base, the second distance being greater than the first distance.

24. The platform of claim 23 where said clamping bar extends a distance from said base equal to the second distance.

25. The platform of claim 15 further comprising at least one slip-resistant foot.

26. The platform of claim 15 further comprising a power tool fastened to said platform.

27. A method of securing a tool or appliance to a workstation having clamping tables by clamping to the workstation said platform of claim 15 to which the tool is fastened.

28. The platform of claim 15 where said clamping bar is integrally connected to said base.

29. The platform of claim 12 where said table support in part defines a perimeter edge of said base.

30. A portable mounting platform for supporting a tool or appliance affixed thereto, said platform comprising:

a base having a mounting surface;

a table support positioned at a perimeter of said base and extending a first distance from said base opposite said mounting surface;

a clamping bar connected to said base along a generally medial region of said base and extending a second distance, greater than the first distance, from said base opposite said mounting surface and configured to be received within a gap of a clamping workstation; and a first support beam connected to and extending from said base opposite said mounting surface, said first support beam extends a third distance from said mounting surface, the second distance being the same as the third distance.

31. A portable mounting platform for supporting a tool or appliance affixed thereto, said platform comprising:

a base having a mounting surface;

a table support positioned at a perimeter of said base and extending a first distance from said base opposite said mounting surface;

a clamping bar connected to said base along a generally medial region of said base and extending a second distance, greater than the first distance, from said base opposite said mounting surface and configured to be received within a gap of a clamping workstation;

a further table support extending from said base opposite said mounting surface and oriented generally perpendicular to said clamping bar; and a first support beam connected to and extending from said base opposite said mounting surface.

* * * * *